United States Patent [19]

McMurtry

[11] Patent Number: 4,663,823
[45] Date of Patent: May 12, 1987

[54] MACHINE TOOL

[75] Inventor: David R. McMurtry, Wotton-under-Edge, England

[73] Assignee: Renishaw plc, Wotton-under-Edge, England

[21] Appl. No.: 786,177

[22] PCT Filed: Mar. 10, 1983

[86] PCT No.: PCT/GB83/00072
§ 371 Date: Nov. 9, 1983
§ 102(e) Date: Nov. 9, 1983

[87] PCT Pub. No.: WO83/03068
PCT Pub. Date: Sep. 15, 1983

Related U.S. Application Data

[63] Continuation of Ser. No. 551,973, Nov. 9, 1983, abandoned.

[30] Foreign Application Priority Data

Mar. 10, 1982 [EP] European Pat. Off. ............ 8330135
Mar. 10, 1982 [GB] United Kingdom ................ 8206951

[51] Int. Cl.$^4$ ............................................. B23B 31/26
[52] U.S. Cl. .................... 29/568; 279/1 TS; 409/232
[58] Field of Search ............... 29/568, 563; 409/232, 409/231, 233, 234; 279/1 TS, 4, 47, 2, 51, 37, 55, 19; 408/240; 82/2, 5

[56] References Cited

U.S. PATENT DOCUMENTS

| | | | |
|---|---|---|---|
| 1,990,525 | 2/1935 | Chancellor | 279/37 |
| 2,708,117 | 5/1955 | Flory | 279/51 |
| 2,833,546 | 5/1958 | Johnson | 279/51 |
| 3,038,386 | 6/1962 | Parske et al. | 409/233 |
| 3,210,836 | 10/1965 | Johanson et al. | 279/51 X |
| 3,542,383 | 11/1970 | Farley et al. | 279/2 |
| 3,599,999 | 8/1971 | Schnizler et al. | 408/240 X |
| 3,643,969 | 2/1972 | Finley et al. | 409/232 X |
| 3,795,984 | 8/1976 | Simmons | 409/233 |
| 4,063,488 | 12/1977 | Kagerer | 409/233 |
| 4,122,755 | 10/1978 | Johnson et al. | 408/238 X |
| 4,128,043 | 12/1978 | Grassl | 279/51 X |
| 4,404,727 | 9/1983 | Zankl | 29/568 |

FOREIGN PATENT DOCUMENTS

| | | | |
|---|---|---|---|
| 1961673 | 6/1971 | Fed. Rep. of Germany | 409/233 |
| 1125544 | 10/1956 | France | 279/4 |
| 566564 | 1/1945 | United Kingdom | 279/46 R |
| 1531111 | 11/1978 | United Kingdom | 409/233 |

Primary Examiner—Gil Weidenfeld
Assistant Examiner—Glenn L. Webb
Attorney, Agent, or Firm—Spencer & Frank

[57] ABSTRACT

In a machine tool having a spindle supporting a work holder, means are provided for automatically operating the work holder to grip or release a workpiece and for automatically securing the work holder to the spindle or release it therefrom. Within the spindle, a compression spring acts on a slide which has claws gripping a head provided at one end of a holder housing to draw the latter into engagement with a conical socket of the spindle thereby to secure the holder. Within the holder housing, a compression spring urges a set of jaws into a conical socket of the housing thereby to grip a workpiece. A hydraulic actuator mounted on fixed structure is adapted both for opening the jaws and for releasing the holder from the spindle. For opening the jaws, a piston of the actuator is moved through an initial distance X thereby to move the jaws in opposition to the spring in the opening sense. The piston acts through the intermediary of a rod supported in the slide for free movement relative thereto. For release of the holder from the spindle, the piston is moved further, through a distance Y, to engage and move the slide in the sense causing the claws to abut a shoulder on the holder housing and release the holder from the socket. Toward the end of the piston movement the claws spring radially outwards into a recess of the spindle to free the holder for removal by an automatic transfer mechanism.

6 Claims, 9 Drawing Figures

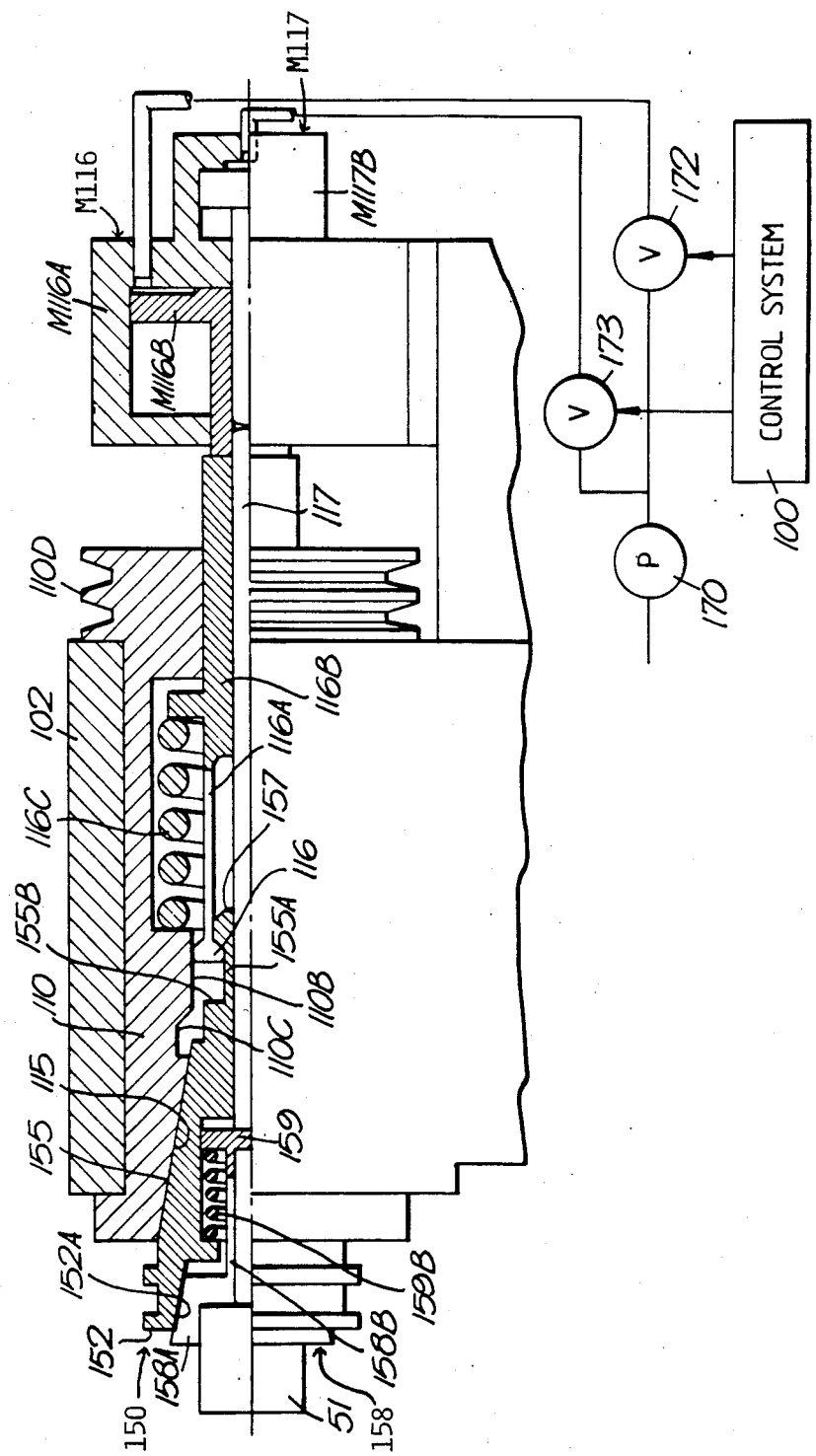

MACHINE TOOL

This application is a continuation of application Ser. No. 551,973, filed Nov. 9, 1983, now abandoned.

BACKGROUND OF THE INVENTION

This invention relates to machine tools and is concerned with mounting of work holders on a machine tool spindle and the operation of the work holder when so mounted.

It is known to provide a work holder with a grip element which can be automatically moved between positions in which it grips and releases the workpiece. It is an object of this invention to provide such a work holder with the facility for being mounted automatically on the spindle so that the work holder can be changed in a numerically controlled machine tool without the need for operator intervention. The need for automatic mounting arises, for example, if one end of the workpiece has been machined and the workpiece has to be turned round to be held by said one end while the other end of the workpiece is machined, said one end, having been machined, usually has a shape or a diameter different from that other end, the latter usually still having the dimension of the original workpiece blank. Therefore a change of work holder is often required before the workpiece can be held at said one end. This applies especially in cases where the work holder is of a type which type is suitable for automatic operation of the gripper elements but usually cannot accommodate large differences in the size of the workpiece.

SUMMARY OF THE INVENTION

According to this invention there is provided a machine tool comprising a fixed structure, a spindle supported for rotation on the fixed structure, a work holder having gripper jaws movable between work gripping and work release positions, gripper operating means provided on the fixed structure and connected to the jaws for moving the jaws between said positions thereof, a coupling having first and second coupling elements provided respectively on the spindle and on the work holder and movable between engaged and disengaged positions, coupling operating means provided on the fixed structure and connected to the coupling elements for moving the coupling elements between said positions thereof to respectively connect the work holder to the spindle and release it therefrom.

BRIEF DESCRIPTION OF THE DRAWINGS

Examples of a machine tool according to this invention will now be described with reference to the accompanying drawings wherein.

DETAILED DESCRIPTION OF EXAMPLES

Figure 1:
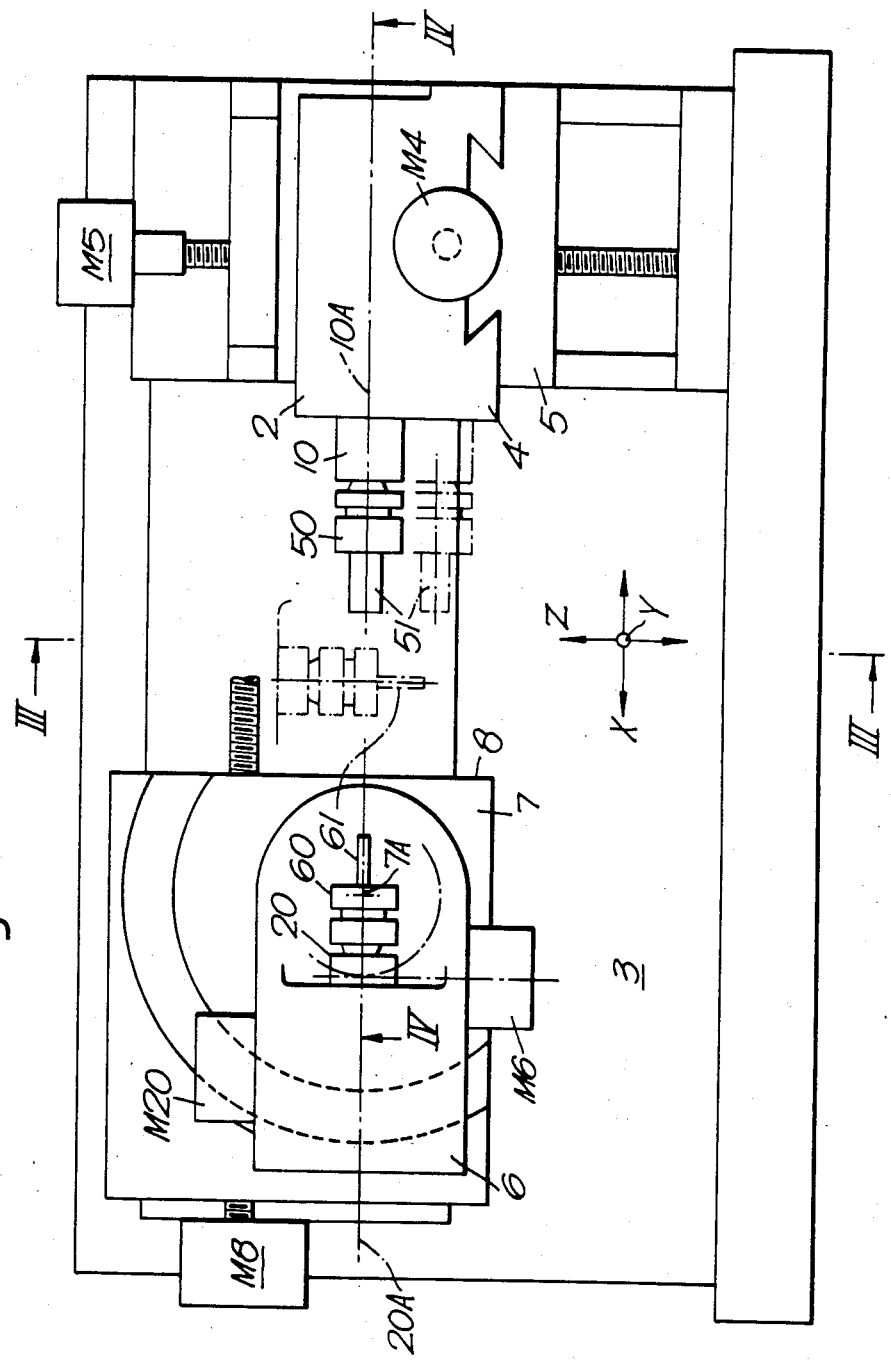
FIG. 1 is an elevation of the machine tool.
Figure 2:
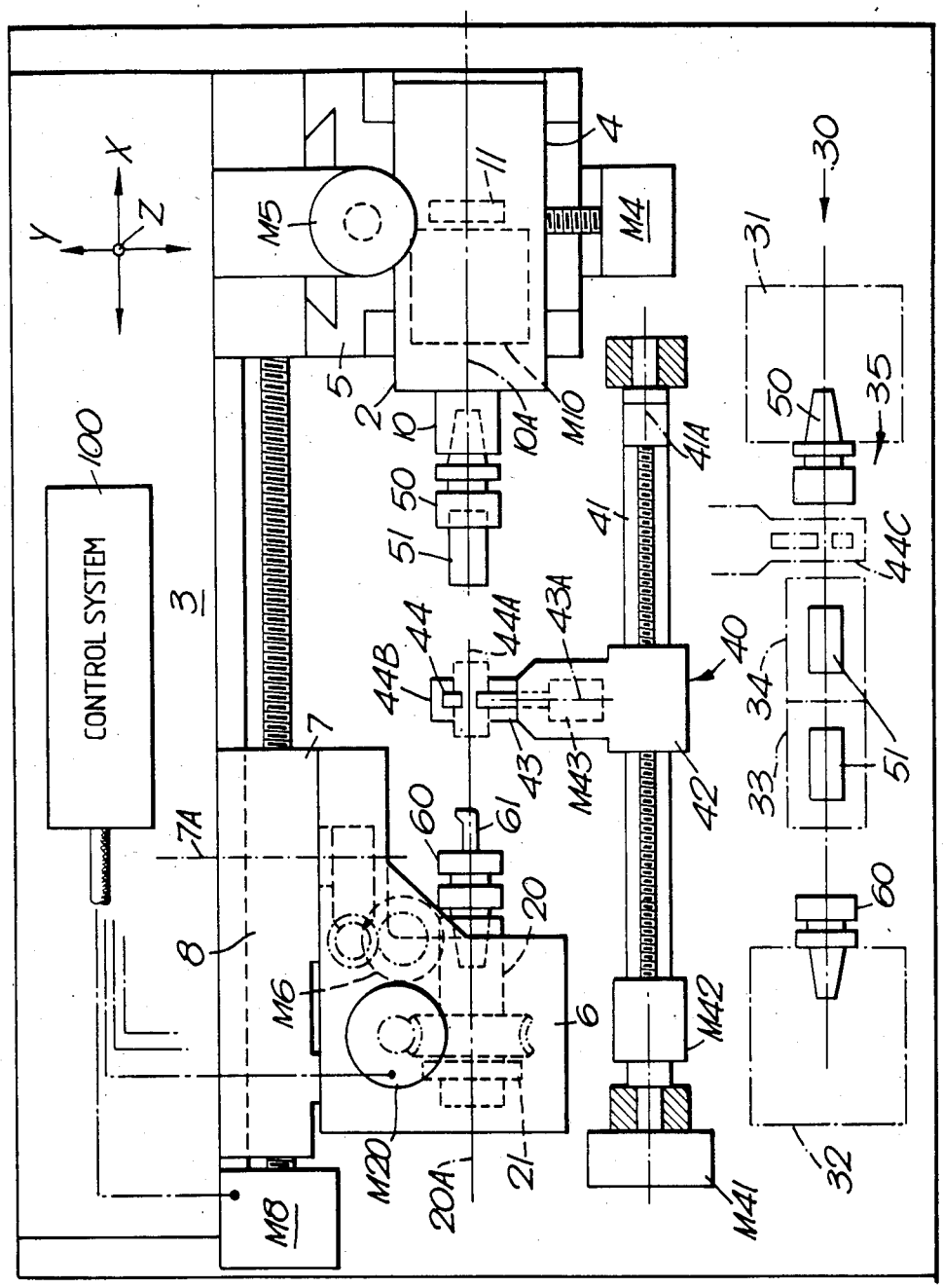
FIG. 2 is a plan view of the machine tool.
Figure 3:
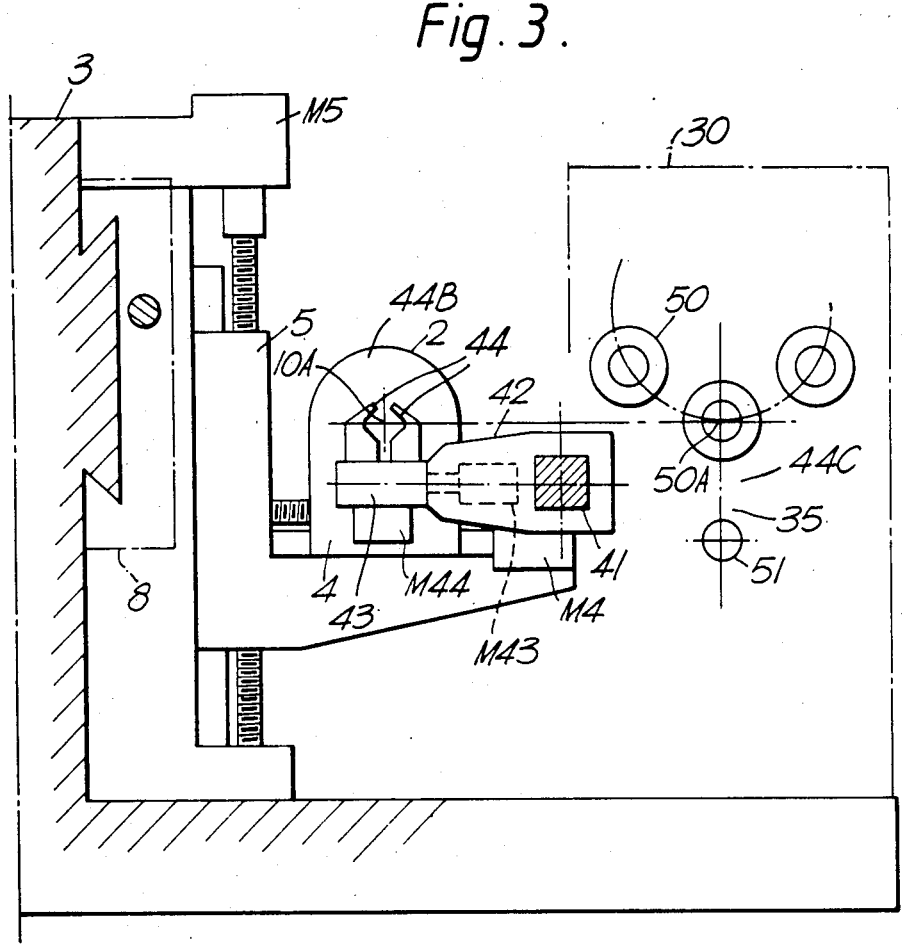
FIG. 3 is a section on the line III—III in FIG. 1.
Figure 5:
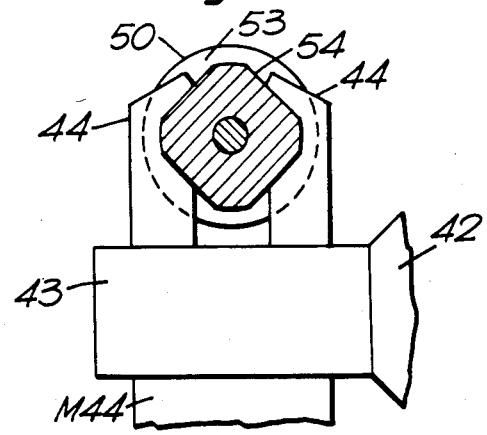
FIG. 5 is a section on the line V—V in FIG. 4, and
FIGS. 6, 7, 8 and 9 are views similar to FIG. 4, and show respectively a second, third, fourth, and fifth example of a said spindle and work holder assembly.
Figure 4:
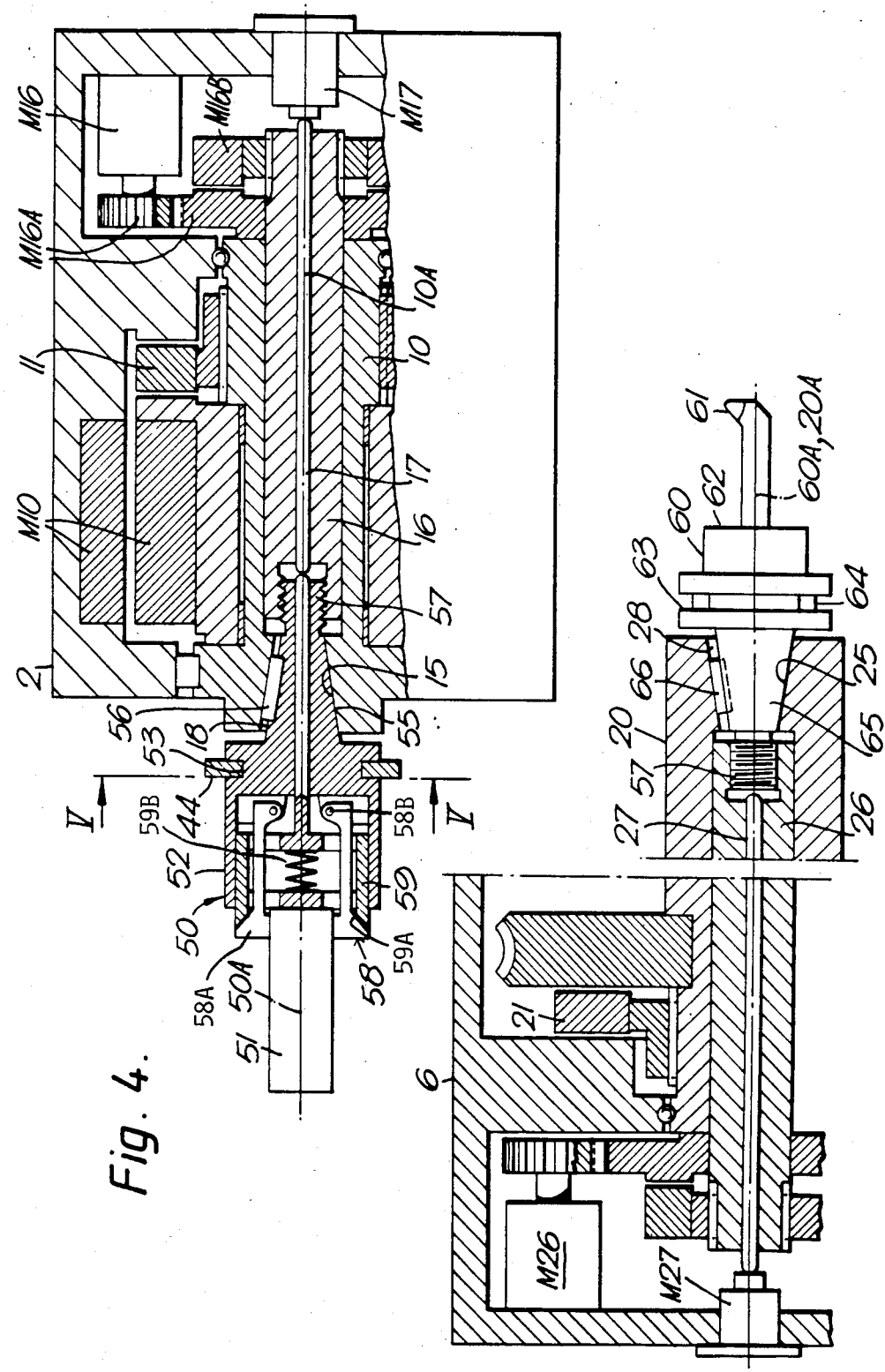
FIG. 4 is a section on the line IV—IV in FIG. 1 and shows a first example of a spindle and work holder assembly being a part of the machine tool.

Referring to FIGS. 1 to 5, the machine tool comprises a spindle 10 supported for rotation about an axis 10A by a bearing housing 2 which constitutes stationary structure as far as the spindle 10 is concerned. Rotation of the spindle 10 is effected by an electric motor M10 (FIGS. 2,4). The spindle 10 can be stopped in a predetermined angular position by an electro-magnetic brake 11. The spindle 10 supports a work holder 50 shown to hold a workpiece 51 intended to be machined by a tool 61. The machine includes a magazine system 30 (FIGS. 2,3) comprising a work holder magazine 31, a tool holder magazine 32, a magazine 33 for blank workpieces, and a magazine 34 for finished workpieces. The magazine 31 stores different holders 50 adapted for workpieces of different diameters or shapes. The machine further includes a transfer mechanism 40 operable to present any work holder, tool holder or blank workpiece contained in the respective magazines 31,32,33 at a pick-up station 35 and to transfer a finished workpiece to said station 35.

The mechanism 40 comprises a shaft 41 having an axis 41A and extending parallel to the axis 10A in a position between the spindle 10 and the magazine system 30. An arm 42 is supported on the shaft 41 for axial motion therealong but against rotation relative thereto. The arm 42 has a hand 43 rotatable about an axis 43A perpendicular to the axis 41A and supporting a pair of gripper fingers 44 having a gripper axis 44A. Motors M41, M42, M43 and M44 are provided for moving the arm along the shaft 41, rotating the shaft 41 about its axis 41A, rotating the hand 43 about the axis 43A, and opening or closing the fingers 44. The arrangement is such that, by rotation of the shaft 41 about the axis 41A, and rotation of the hand 43 about the axis 43A, the fingers are movable between a position 44B (FIG. 2), in which the axis 44A is aligned with the axis 10A, and a position 44C in which the axis 44A is situated in line with the axis 50A of a work holder available to be picked up at the pick-up station 35. By movement of the arm 42 axially along the shaft 41, the fingers 44 are movable into proximity with the individual magazines 31 to 34. The axial movement of the arm 42 and rotation of the hand 43 are preferably carried out during the angular motion of the arm 42 between said positions 44B, 44C. The rotation of the hand 43 about its axis 43A is used when the holder 50 has to be turned for reversing the workpiece 51 end to end.

The work holder 50 (FIG. 4) has a housing 52 having a groove 53 engageable by the fingers 44 of the mechanism 40. The groove 53 has a square bottom 54 (FIG. 5) cooperating with the fingers 44 to determine the angular position of the holder about its axis 50A when held by the fingers 44. The housing 52 has a conical spigot 55 engageable with a conical socket 15 of the spindle 10 when the work holder is presented to the spindle by the mechanism 40. The spindle 10 supports a nut 16 engageable with a screw-threaded end 57 of the spigot 55 to draw the spigot into firm engagement with the socket or, by reverse rotation of the nut, release the spigot from the socket. The relatively small amount of axial movement of the work holder under the action of the nut 16 is accommodated by corresponding movement of the mechanism 40 and a small amount of relative axial sliding between the work holder 50 and the gripper fingers 44. The nut 16 is rotated by an actuator M16 which is mounted on the housing 2 and is connectable to the nut 16 by gearing M16A and an electro-magnetic coupling M16B. The spigot 55 has a key 56 engageable with a keyway 18 in the socket to determine the angular position of the holder 50, and thus of the workpiece, on the spindle 10 about the axis 10A. The socket 15, spigot 55, threaded end 57 and the nut 16 define a means for releasably securing the holder 50 to the spindle 10.

The work holder 50 comprises a gripper element 58 arranged within the housing 52 and having gripper jaws 58A pivoted to the housing at 58B. The jaws 58A are operable by a member 59 arranged in the housing 52 and acted on by a rod 17 supported for axial movement within the spindle 10. The movement of the rod is effected by an hydraulic actuator M17 comprising a cylinder secured to the housing 2 and a plunger engageable with the rod 17. To grip the workpiece 51, the actuator M17 is fed with hydraulic pressure fluid for the plunger to push the rod towards the work holder 50 so that the member 59 is urged into a gripping position in which tapered portions 59A of the members 59 act on the jaws 58A to grip the workpiece. When the hydraulic pressure is released, a spring 59B returns the member 59 and the rod 17 to a position in which the workpiece is released. It will be seen that the actuators M16,M17 are means for operating the nut 16 and the rod 17 one independently of the other.

The machine includes a control system 100 (FIG. 2) connected to all the motors and actuators described to effect automatic operation thereof in accordance with a programme. Automatic operation of motors and actuators in accordance with a programme is well understood per se.

FIG. 6 shows a work holder 150 comprising a housing 152 having a conical spigot 155 engageable with a corresponding socket 115 in a spindle 110 supported for rotation in a bearing housing 102. The spindle 110 is rotatable by a pulley drive 110D. The spigot 155 has an extension 155A having an annular head 157 engageable by an annular array of claws 116 provided on resilient, radially outwardly sprung limbs 116A extending from a slide 116B supported for axial movement within the spindle 110. A spring 116C urges the slide in a direction away from the socket 115 into a position in which the claws 116 are retained within a bore 110B of the spindle thereby to grip the head 157 and draw the spigot firmly into engagement with the socket 115 and in this way secure the work holder 150 to the spindle 110. An hydraulic actuator M116 has a cylinder M116A secured to the housing 102 and a piston M116B engageable with the slide 116B. To release the work holder 150 from the spindle, the actuator M116 is operated to urge the slide 116B toward the socket 115. This causes the claws 116 to slide in the bore 110B until they abut a shoulder 155B of the spigot 155 and disengage the latter from the socket 115. The actuator M116 continues to move the slide until the claws 116 spring radially outwardly into a recess 110C of the spindle 110 and release the head 157. The work holder 150 is then free to be removed from the spindle by the mechanism 40 in the same way as described with reference to the work holder 50 and FIGS. 1 to 5. If the work holder 150 is to be engaged with the spindle 110, the actuator M116 is operated to move the claws 116 into the recess 110B for reception of the head 157, the mechanism 40 is operated to insert the work holder into the socket 115 and the actuator M116 is operated to allow the spring 116C to move the claws 116 in the sense of gripping the extension 155A behind the head 157 and draw the spigot into firm engagement with the socket.

The work holder 150 has a gripper element 158 comprising an annular array of gripper jaws 158A arranged within a conical socket 152A provided in the housing 152. The jaws 158A are provided on respective, radially outwardly sprung, resilient limbs 158B extending from a slide 159 supported for axial movement in the housing 152. A spring 159B urges the slide 159 in the direction causing the jaws 158 to be drawn into socket 152A thereby to grip the workpiece 51. An hydraulic actuator M117 has a cylinder secured to the housing 102 and a piston M117B engageable through a rod 117 with the slide 159. To release the workpiece the actuator M117 is operated to urge the slide toward the large diameter end of the conical socket 152A thereby allowing the limbs 158B to spring the jaws 158A radially outwards and release the workpiece. The actuators M116,M117 are supplied with pressurised hydraulic fluid from a pump 170 acting through valves 172,173 operated by the control system 100 to supply the fluid to the actuators M116,M117 respectively.

In the following description of FIGS. 7,8,9 new reference numerals are used only where the construction of the particular example differs from that of an example already described.

Figure 7:
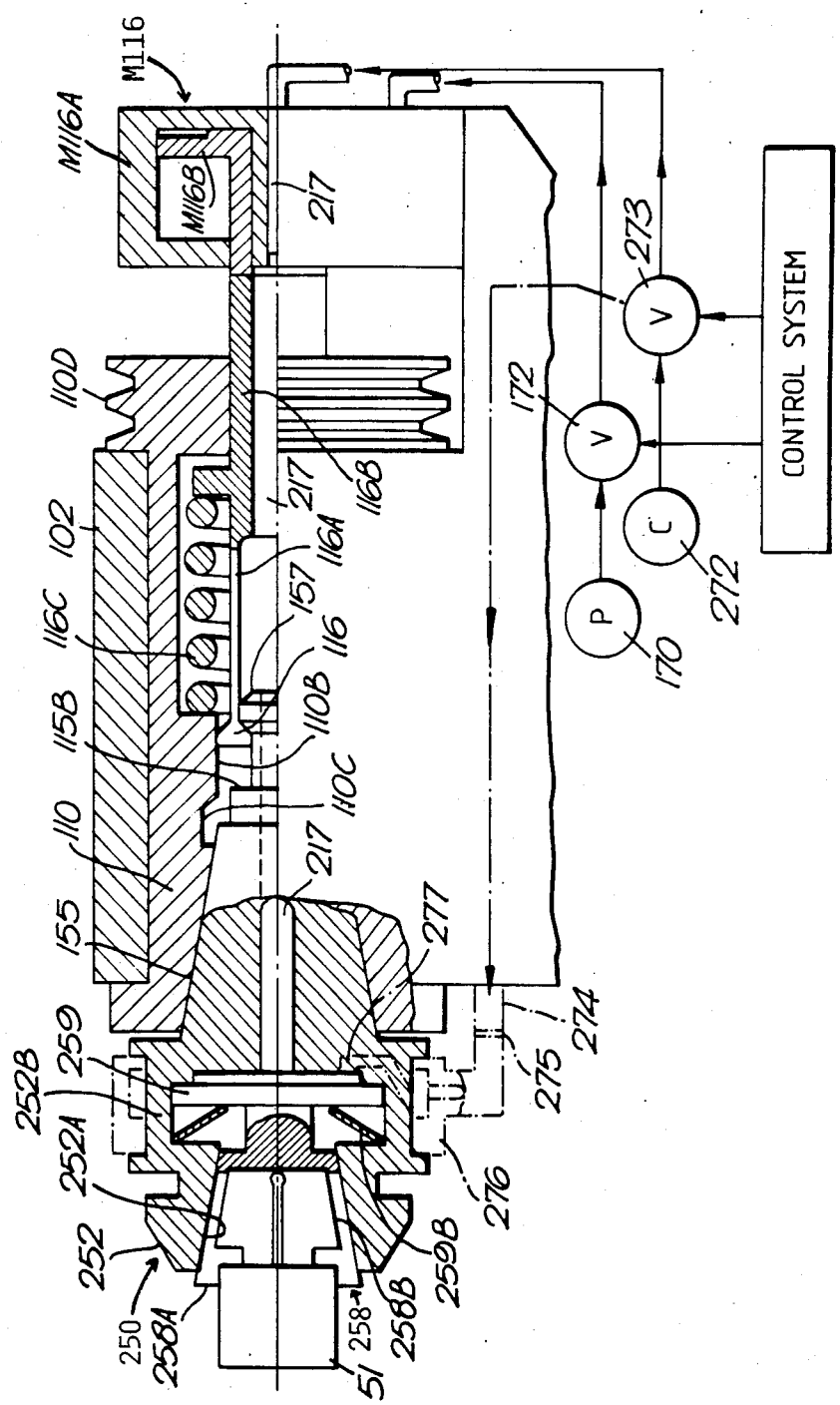

The example shown in FIG. 7 is similar to that shown in FIG. 6 except in the construction of the work holder, here denoted 250, which comprises a gripper element 258 having an annular array of gripper jaws 258A arranged within a conical socket 252A provided in a housing 252. The jaws 258A are provided on respective, radially outwardly sprung, resilient limbs 258B extending from a piston 259 supported for axial movement within a cylinder 252B provided in the housing 252. A Belville spring 259B urges the piston 259 in the direction causing the jaws 258A to be drawn into the socket 252A thereby to grip the workpiece 51. To release the workpiece, a valve 273 is opened thereby to supply compressed air from a compressor 272 through a bore 217 extending through the piston M116B, the slide 116B and the spigot 155 to the cylinder 252B thereby to urge the piston 259 in the sense of compressing the spring 259B and allow the jaws 258A to open. The valve 273 may be turned on when the holder 250 is in the course of being inserted into the socket 252A. The airflow then operates to clean the surfaces of the spigot 155 and socket 252A in the sense of blowing off any particles that may be present on these surfaces.

In a modification indicated in chain-dotted lines in FIG. 7, the air supply, instead of being connected to the bore 217 is connected to a pipe 274 provided on the bearing housing 102 and connected by a releasable coupling 275 to a sleeve 276 supported on the housing 252 of the work holder, and further connected through the sleeve 276 to a port 277 in the cylinder 252B. The housing 252 is rotatable in the sleeve while the latter is stationary by virtue of its connection to the pipe 274. The fingers 44 of the transfer mechanism 40 are adapted to retain the sleeve 276 in a given angular position so that when the work holder is introduced to the spindle the cooperating parts of the coupling 275 are in alignment.

Figure 8:
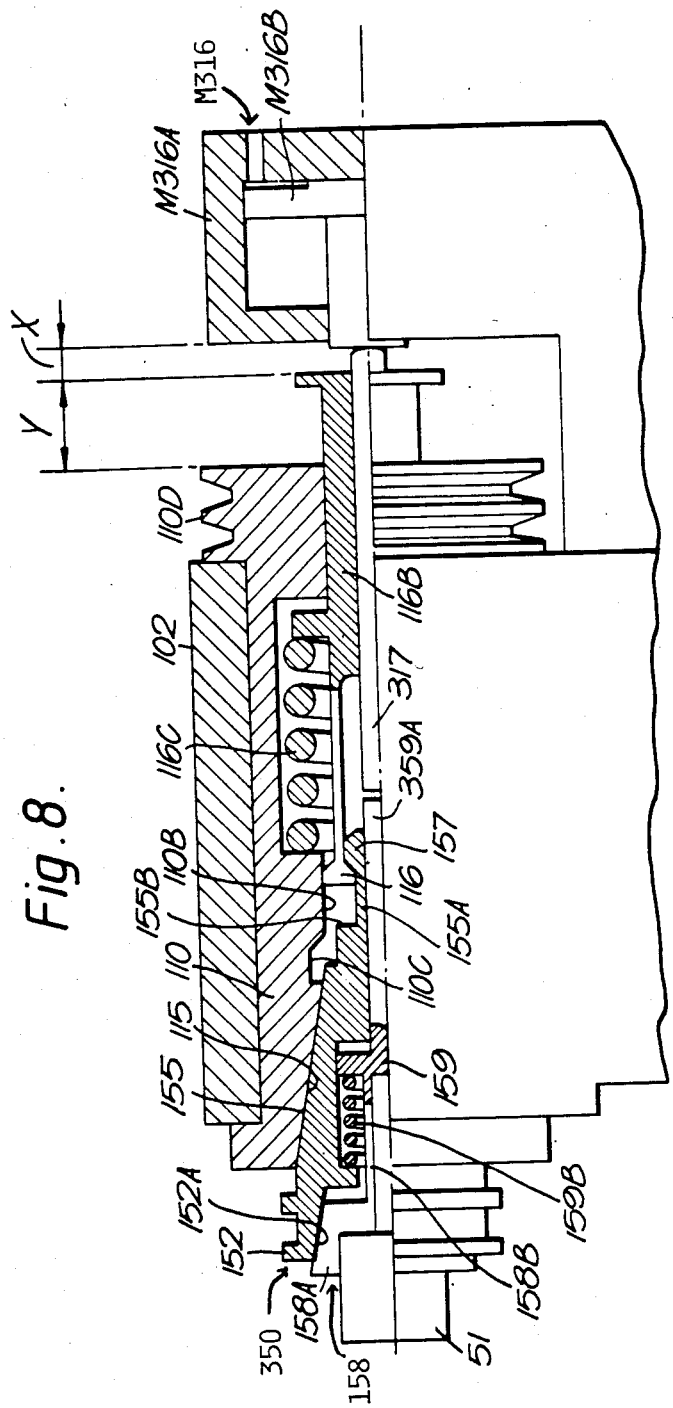

The example shown in FIG. 8 is similar to that shown in FIG. 6 except in that a single actuator M316 is adapted both for release of the work holder, here denoted 350, from the spindle, and release of the workpiece from the work holder. For release of the workpiece, a rod 317 secured to the slide 116B is arranged to abut an extension 359B of the slide 159 when a piston M316B is moved by hydraulic fluid fed to a cylinder M316A. The movement of the piston causes the jaws 158B to move in the opening sense and release the workpiece. The movement of the jaws takes place in opposition to the spring 159B which undergoes compression. The amount of the piston movement necessary to open the jaws is indicated by the distance X. The movement through that distance does not significantly affect the hold of the spigot 155 in the socket 115 because the spring 159B is arranged to be weaker than the spring 116C. The distance X defines a lost motion between the piston and the member 116B during which the jaws are opened. On completion of the lost motion the piston abuts the member 116B. For release of the work holder from the spindle 110, the feed of hydraulic fluid to the cylinder is continued for the piston to move through a distance Y during which movement the claws 116 abut the shoulder 155B and release the spigot 155 from the socket 115.

Figure 9:
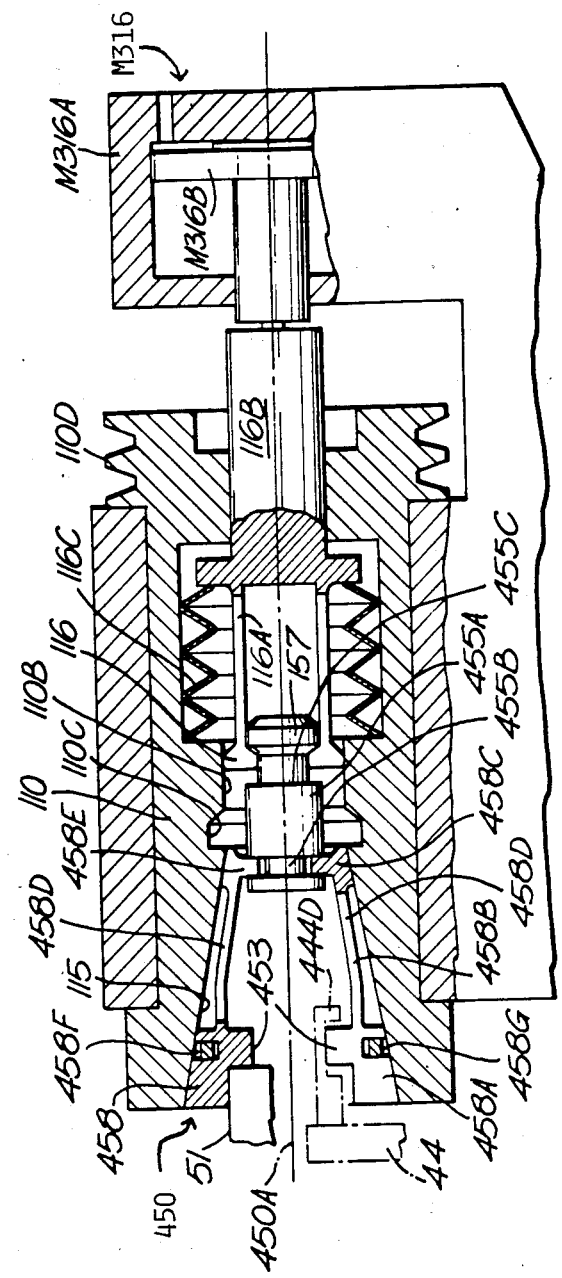

The example shown in FIG. 9 is similar to that shown in FIG. 8 except in that the work holder, here denoted 450, does not have a housing 152 and socket 152A (such as shown in FIGS. 6, 7 and 8) for engagement by the gripper element. Instead there is provided a gripper element 458 adapted to be in direct engagement with the socket 115 of the spindle 110 and cooperate therewith both for securing the work holder on the spindle and for operating the gripper jaws. To this end, the holder 450 comprises an annular array of front jaws 458A connected by resilient limbs 458B to rear jaws 458C. The element 458 is produced by cutting axial slots 458D into an annular blank, circumferentially successive such slots being open alternately at the front and at the rear jaws. The rear jaws 458C each have a radially inward extension 458E engaging a groove 455B in a member 455A extending from the element 458 toward the claws 116. The head 157 is, in this example, provided on the member 455A and cooperates with the claws 116 to secure the element 458 on the spindle 110, and simultaneously grip the workpiece, under the force of the spring 116C.

To release the workpiece from the work holder, the actuator M316 is operated to move the slide 116B toward the holder until the claws 116 abut a should 455C provided on the member 455A and the latter is moved, together with the gripper element 458 by an initial amount sufficient to release the workpiece. To release the work holder from the spindle, the actuator M316 is operated to move further until the claws 116 spring into the recess 110C and release the work holder. The construction of the element 458 in terms of the front and rear jaws 458A,458C makes it possible for the element 458 to maintain a constant cone angle so that good engagement between the element 458 and the socket 115 is obtained over the whole length of the element 458. This is desirable because of the dual-function, i.e. holding both the work and the work holder, which the element 458 has in this example.

For engagement by the mechanism 40, the holder 450 is provided with a groove 53. However, as an alternative the holder may be provided with ribs 453 for engagement by extensions 444D of the fingers 44 acting at the interior of the element 458. A ring 458G in a groove 458F of the front jaws 458 limits the expansion of the element 458 under the force of the fingers 44.

I claim

1. A machine tool comprising
a fixed structure;
a spindle supported for rotation on said fixed structure, said spindle having a socket formed therein;
a work holder having jaws movable between work gripping and work release positions, said work holder including a spigot engageable with the socket of said spindle;
a first coupling element provided on the spigot of said work holder;
a coupling intermediate member supported on said spindle for movement relative thereto;
a second coupling element secured to said coupling intermediate member, said second coupling element being movable with respect to said first coupling element for engagement and disengagement therewith;
coupling operating means provided on said fixed structure and connected to said coupling intermediate member for engaging and disengaging said second coupling element with and from said first coupling element thereby connecting said work holder to said spindle and releasing it therefrom;
gripper operating means provided on said fixed structure; and
a gripper intermediate member coupling said gripper operating means to the jaws of said work holder, said gripper operating member being supported on said coupling intermediate member for movement relative thereto, whereby said gripper operating means acts on said gripper intermediate member to move said jaws between said gripping and work release positions independently of the position of said coupling intermediate member.

2. A machine tool comprising
a fixed structure;
a spindle supported for rotation on said fixed structure, said spindle having a socket formed therein;
a work holder having jaws movable between work gripping and work release positions, said work holder including a spigot engageable with the socket of said spindle;
a first coupling element provided on the spigot of said work holder;
a coupling intermediate member supported on said spindle for movement relative thereto;
a second coupling element secured to said coupling intermediate member, said second coupling element being movable with respect to said first coupling element for engagement and disengagement therewith;
a gripper intermediate member coupled to the jaws of said work holder; and
single operating means provided on said fixed structure for acting both on said gripper intermediate member and on said coupling intermediate member, lost motion being permitted between said single operating means and said coupling intermediate member such that the coupling remains at least substantially engaged during said lost motion, said single operating means being arranged to act on said gripper intermediate member during said lost motion to open said jaws and to act on said coupling intermediate member on completion of said lost motion to release said work holder from said spindle.

3. A machine tool comprising
a fixed structure;
a spindle supported for rotation within said fixed structure, said spindle having a socket formed therein;
a work holder having jaws movable between work gripping and work release positions, said work holder including a spigot engageable with the socket of said spindle;

first operating means attached to said fixed structure;

means coupling said first operating means to said work holder for engaging said work holder with said spindle and disengaging said work holder from said spindle;

second operating means attached to said fixed structure; and means coupling said second operating means to the jaws of said work holder for gripping and releasing said work, whereby said first operating means functions independently of said second operating means to engage said work holder with said spindle and disengage it thereform, and said second operating means functions independently of said first operating means to grip and release said work by means of said jaws.

4. A machine tool according to claim 1, wherein said work holder has an axis and comprises a gripper element including said jaws, said spindle comprises a tapered socket engageable by said jaws, said jaws being movable axially relative to the socket and the socket cooperating, responsive to such movement, to position the jaws radially for gripping and releasing a workpiece and further cooperating to position the jaws axially in respect of the spindle when the jaws grip a workpiece between them, and wherein there is provided a means for moving the gripper element axially toward said small end of the socket.

5. A machine tool according to claim 4, wherein said socket has a large and a small end, said gripper element comprises an array of first jaws engageable with the socket at said large end thereof, an array of second jaws engageable with the socket at said small end thereof, and resilient limbs connecting each said first jaw to two corresponding said second jaws.

6. A machine tool according to claim 5, wherein said second coupling element is itself connected to said second jaws for effecting movement of the gripper element axially toward said large end of the socket.

* * * * *